(12) United States Patent
Keller et al.

(10) Patent No.: US 6,588,530 B2
(45) Date of Patent: Jul. 8, 2003

(54) MOTORCYCLE ENGINE MOUNTING SYSTEM

(75) Inventors: Duncan Adam Keller, Los Gatos, CA (US); Gregory Spak, San Jose, CA (US)

(73) Assignee: A.E. Technologies, Inc., San Jose, CA (US)

( * ) Notice: Subject to any disclaimer, the term of this patent is extended or adjusted under 35 U.S.C. 154(b) by 18 days.

(21) Appl. No.: 10/013,208

(22) Filed: Dec. 7, 2001

(65) Prior Publication Data

US 2003/0106733 A1 Jun. 12, 2003

(51) Int. Cl.[7] ............................. B62M 7/02; B62K 11/04
(52) U.S. Cl. ........................................................ 180/228
(58) Field of Search ................................ 180/228, 218, 180/219; 280/284, 285

(56) References Cited

U.S. PATENT DOCUMENTS

| | | | | |
|---|---|---|---|---|
| 3,754,612 A | * | 8/1973 | Watanabe et al. | 180/33 B |
| 4,237,996 A | * | 12/1980 | Matsuda et al. | 180/229 |
| 4,323,135 A | * | 4/1982 | Tominaga et al. | 180/228 |
| 4,412,597 A | * | 11/1983 | Aiba | 180/228 |
| 4,724,920 A | * | 2/1988 | Tsuchida et al. | 180/227 |
| 5,109,943 A | * | 5/1992 | Crenshaw et al. | 180/228 |
| 5,390,758 A | * | 2/1995 | Hunter et al. | 180/228 |
| 5,639,075 A | * | 6/1997 | Tyree | 267/281 |
| 6,213,240 B1 | * | 4/2001 | Buell | 180/228 |
| 6,315,072 B1 | * | 11/2001 | Brown et al. | 180/228 |

* cited by examiner

*Primary Examiner*—Avraham Lerner
(74) *Attorney, Agent, or Firm*—Donald R. Boys; Central Coast Patent Agency, Inc.

(57) ABSTRACT

A vibration-isolation system for assembly of a motorcycle frame with an engine/transmission unit has a first pivotal mount at a rear portion of the frame and engine/transmission unit, the first mount comprising all rigid bearing components mounted to solid elements of both the frame and the engine/transmission unit, the first mount thereby allowing the engine/transmission unit to rotate around the first mount in substantially a vertical plane of the frame, but allowing no pivotal movement in any other plane or any translation movement in any direction relative to the frame; and a second mount at a front portion of the frame and engine/transmission unit, the second mount incorporating one or more elastomeric elements between a solid interface to the frame and a solid interface to the engine/transmission unit, thereby allowing substantially vertical translation of the engine transmission unit relative to the frame at the second mount, the translation of an amplitude limited by the elastomeric elements, and thereby limiting the rotation of the engine/transmission unit around the first pivotal mount.

28 Claims, 7 Drawing Sheets

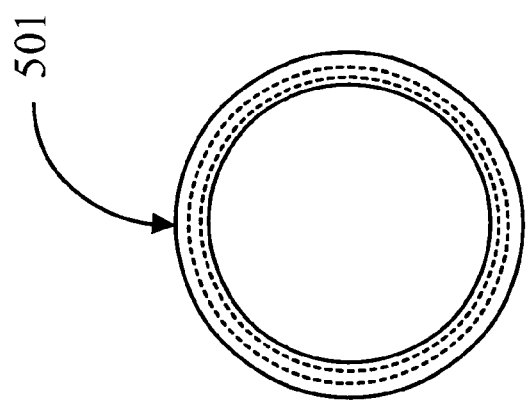
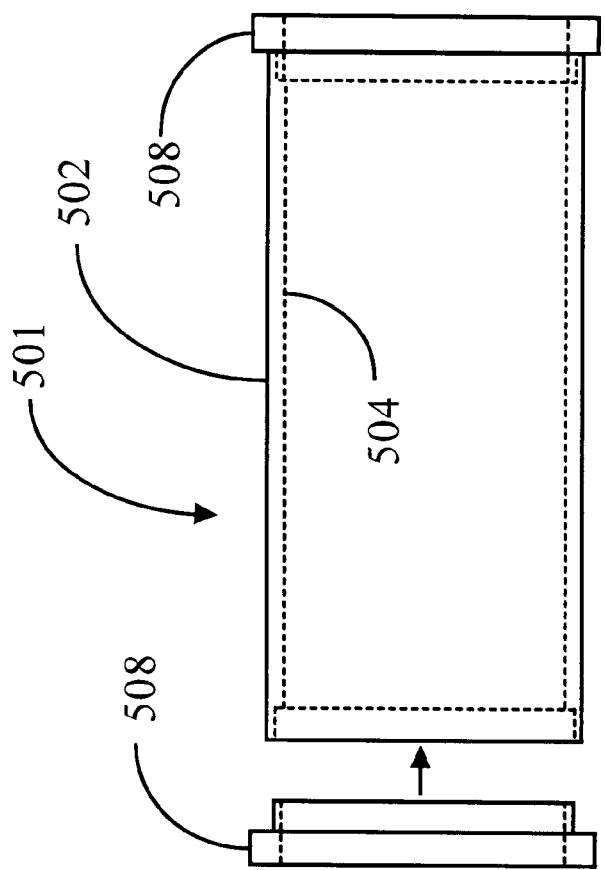
Fig. 5b
Fig. 5a

MOTORCYCLE ENGINE MOUNTING SYSTEM

FIELD OF THE INVENTION

The present invention is in the field of motorcycle chassis, and pertains more particularly to systems for mounting motorcycle engines to the chassis.

BACKGROUND OF THE INVENTION

Since the introduction of the first two-wheeled self-propelled motorcycle, which was a converted bicycle with a small, centrally mounted spark ignition engine, many design improvements and other innovations have been incorporated to improve such aspects as speed, power-to-weight ratio, and handling and stability performance. Motorcycles with engines having larger power capacity and engine displacements were increasingly desired early in development because of the increased speed and acceleration capabilities, and required innovative advancements in the technology pertaining to chassis and power train rigidity in order to handle problems caused by greatly increased stresses that could be imposed upon the components during operation of such higher performance motorcycles.

During normal operation of motorcycles the front and rear wheels rotating within the same plane are continually subjected to forces urging them from their proper alignment in order to keep the motorcycle balanced upright within the center of gravity. Even while traveling a straight line the motorcycle must be alternately steered into the direction it is leaning to keep from falling over. The resulting operating loads, although slight during traveling a straight line, are greatly increased during the execution of a turn, becoming quite extreme when the turn is executed at high speeds. Handling and stability can be greatly compromised if the motorcycle chassis does not provide a sufficient level of strength and rigidity.

Much handling and stability performance for a motorcycle is also lost if the suspension of the motorcycle allows the wheels to be excessively forced from their plane of rotation. For example, the rear wheel, rotatably attached to a rigid swing arm having usually a pair of extended arms cantilevered at the rear of the frame, a standard design in the art, is particularly exposed to such forces during high-speed turns. Any excess deflection from its vertical plane during a high-speed turn can seriously impact stability and handling causing an unsafe condition. It is also therefore important to limit, as much as possible, any movement of the rear swing arm that is in a direction other than that within its intended vertical movement.

A maximum level of handling and stability performance is only achieved when deflection as described above is minimized, to the greatest extent possible, by sufficient rigidity designed into the combined functions of the frame, drive train and suspension, so that only minimal deflection by operating loads of the wheels from their proper alignment is allowed. Many methods have been developed, well known in the art, for improving characteristics of strength and rigidity in the chassis, drive train and suspension.

The chassis of most motorcycles is a frame, usually a combination of tubes and sheets most often manufactured of steel that can be arranged in a variety of different design configurations for different styles and types of motorcycles. The frame is preferably designed to have sufficient stiffness and rigidity, particularly in areas of the frame that would endure pronounced stresses during operation of the motorcycle. One method well known in the art of motorcycle frames, and all related structural art, is the use of triangulation and cross support members in the frame design. Another well-known method of supplementing overall chassis rigidity is a method, more commonly used in the past, of incorporation of a rigid engine mounting system whereby the engine itself is rigidly mounted to the frame and becomes a partially-stressed member of the frame, supplementing the overall rigidity of the chassis. Also, more rigid and stronger connections between the engine and transmission have been used in some cases to supplement rigid or semi rigid engine mount systems, increasing the overall collective rigidity of chassis, power train and rear suspension.

Rider comfort also quickly became an item of much attention in early development, leading to the introduction of many related improvements such as, for example, shock absorbing suspension systems for both front and rear wheels, and advancements in technology pertaining to balancing of reciprocal and rotary vibration of engine components, both being methods for reducing the level of road and engine vibration ultimately absorbed by the frame and rider. The engine of any motorcycle must be designed so that the rotary and reciprocal vibration caused by the internal moving parts are balanced to reduce vibration to a level acceptable in accordance with the intended durability of the frame and engine mount system of the motorcycle, coupled with the level of comfort that should be expected by the rider.

Certain classic styles of motorcycles, such as those designed with long, lower-profile frames and large twin-cylinder engines having high displacement, power and torque, have experienced and retained wide and ever-increasing popularity in today's market. This is largely due to the powerful and nostalgic look and feel, as well as improved performance, comfort and other desirable aspects unique to the style. The cylinders of the engine in such a motorcycle are most often arranged in a vertical "V" configuration; hence the name "V twin" as is commonly used in reference. The pistons within the cylinders and many other engine components are typically much larger and heavier than those of a common smaller displacement four-cylinder engine, producing a much higher level of vibration when the engine is operated, particularly true when the engine is operating at lower or idle speeds or in a high-torque situation. Such vibration, when not sufficiently isolated, can be extremely injurious to the chassis and components, causing fatigue to the frame and problems such as early weld failure or cracks, and so on, and also can be uncomfortable to the point of unbearable to many riders. A motorcycle engine with more than one cylinder has more than one connection point between piston and crank shaft, causing reciprocal and rotary vibration, always existing to some extent regardless of the level of balancing designed into the moving parts of the engine. Different styles of engines have varying numbers, sizes and configurations of cylinders and therefore generate greatly varying levels of vibration. For example, a motorcycle having a smaller displacement four-cylinder engine with much smaller pistons has, because of its design, smaller and more numerous moving internal components, and when the engine is operating the resulting vibration is less pronounced. Conversely, a large displacement twin cylinder engine such as described earlier has large pistons causing much more pronounced vibration, and when combined with the vibration of the other typically heavier internal components, an excessive amount of vibration can be generated, particularly at idle speeds.

Although significant advancements have been made in technology pertaining to the balancing of reciprocal and rotary vibration of engine components, the basic nature of some engine designs, such as, for example, large-cylinder engines as described above, makes balancing to an acceptable level extremely difficult, at least partly due to the orientation and vertical travel directions of the large pistons within the cylinders, causing, along with other internal components, the rotary and reciprocal vibration. In conventional art manufacturers have attempted to solve the vibration problem by utilizing a variety of methods, such as elastomeric engine mounting systems using soft interfaces of various size and durometer, often manufactured of rubberized or similarly resilient material, for mounting the engine to the frame. Such resilient interfaces can sometimes have different aspects of adjustability, and in typical cases they are used in all of the engine mounting locations, usually located at both the front and rear of the power train, and also at the top in many cases, forming a triangular arrangement between the soft engine mount locations.

Other methods known in the art include mounting the rear suspension and engine unit into a separate rigid power train unit which is attached to the main chassis, or by attaching the rear suspension by a pivot arm to mounting members adapted to receive the ends of the pivot arm, or to a pivot point in the housing of an engine or transmission component which may or may not be rigidly mounted to the frame. Although a significant amount of vibration can be isolated from the frame using such conventional systems, the engine is not allowed to adequately contribute to frame rigidity because all of the engine mounts are still resilient in varying degrees, whether or not they incorporate the swing arm pivot function. Handling and stability is further compromised because the rear wheel can be deflected on at least one axis from the plane of the front wheel. This condition compromises the stability of the motorcycle and adversely affects handling and performance, particularly when the motorcycle is operated in high speed during turns.

Another problem compared with many of these methods is that a pronounced engine vibration is still present as the engine operating frequency increases. In this case an inadequately-isolated vibration can produce an uncomfortable riding condition when the engine is operated at higher frequencies.

The previously described known methods for improving the handling and stability of a motorcycle, while maintaining an acceptable level of comfort to the rider through vibration isolation, have often left unsatisfactory results. In many cases these arrangements have reduced vibration while maintaining chassis and suspension rigidity to acceptable levels in some types of motorcycles, such as those with smaller four-cylinder engines having less engine vibration. However, results obtained by attempting to apply these arrangements to motorcycles with larger twin-cylinder engines with excessive vibration such as described above have been unsatisfactory in conventional art.

When such an engine is operated, the engine vibration is most pronounced at idle speed, and because of the elastomeric engine mounts may also be very pronounced when the engine is operated at higher engine speeds. Attempting to isolate such extreme vibration by using rigid engine mounts such as described is not practical and for this reason conventional design for this style of motorcycle teaches an emphasis on soft motor mounting systems compromising overall stability performance of the chassis, drive train and rear suspension, and allowing unacceptable levels of high-frequency engine vibration to transfer to the frame, causing excess fatigue and possible premature damage to the frame, and greater discomfort and fatigue to the rider.

What is clearly needed is improved method and apparatus for mounting an engine in a motorcycle chassis that provides the best possible combination of dampening the extreme engine vibration at various engine operating frequencies, and significant contribution to the level of stiffness between the chassis, engine and power train, and rear suspension system to minimize unbalancing forces in turns and other maneuvers.

SUMMARY OF THE INVENTION

In a preferred embodiment of the present invention a vibration-isolation system for assembly of a motorcycle frame with an engine/transmission unit is provided, comprising a first pivotal mount at a rear portion of the frame and engine/transmission unit, the first mount comprising all rigid bearing components mounted to solid elements of both the frame and the engine/transmission unit, the first mount thereby allowing the engine/transmission unit to rotate around the first mount in substantially a vertical plane of the frame, but allowing no pivotal movement in any other plane or any translation movement in any direction relative to the frame; and a second mount at a front portion of the frame and engine/transmission unit, the second mount incorporating one or more elastomeric elements between a solid interface to the frame and a solid interface to the engine/transmission unit, thereby allowing substantially vertical translation of the engine transmission unit relative to the frame at the second mount, the translation of an amplitude limited by the elastomeric elements, and thereby limiting the rotation of the engine/transmission unit around the first pivotal mount.

In some preferred embodiments the bearing components of the first mount comprise one or more journal bearings, while in others the bearing components of the first mount comprise one or more ball bearings. Also in some embodiments the elastomeric elements of the second mount comprise one or more cylinders of rubber-like material. In some cases there is adjustment apparatus associated with the second mount, enabling a user to adjust the elasticity of the second mount to tune vibration effects of the system.

In some embodiments of the invention the cylinders of rubber-like material are mounted on a shaft having an axis, and the second mount includes a compression apparatus allowing compression of the elastomeric elements in the direction of the axis, thereby adjusting the elasticity of the second mount to tune vibration effects of the system.

In another aspect the assembly includes a swing arm for mounting a rear wheel for a motorcycle using the frame and engine/transmission unit, wherein the swing arm mounts pivotally to the second mount integrally with the engine/transmission unit, thereby allowing the swing arm unit to rotate around the first mount in substantially a vertical plane of the frame, but allowing no pivotal movement in any other plane or any translation movement in any direction relative to the frame.

In yet another aspect of the invention a method for mounting an engine/transmission unit to a frame for a motorcycle to isolate vibration is provided, comprising steps of (a) mounting the engine/transmission unit to a first pivotal mount at a rear portion of the frame, the first mount comprising all rigid bearing components mounted to solid elements of both the frame and the engine/transmission unit, the first mount thereby allowing the engine/transmission unit to rotate around the first mount in substantially a vertical plane of the frame, but allowing no pivotal movement in any other plane or any translation movement in any direction relative to the frame; and (b) mounting the engine/transmission unit to a second mount at a front portion of the frame and engine/transmission unit, the second mount incorporating one or more elastomeric elements between a solid interface to the frame and a solid interface to the engine/transmission unit, thereby allowing substantially vertical translation of the engine transmission unit relative to the frame at the second mount, the translation of an amplitude limited by the elastomeric elements, and thereby limiting the rotation of the engine/transmission unit around the first pivotal mount.

In some embodiment of the method the bearing components of the first mount comprise one or more journal bearings. In other embodiments the bearing components of the first mount comprise one or more ball bearings. In these and other embodiments the elastomeric elements of the second mount may comprise one or more cylinders of rubber-like material.

In some cases of the method there is adjustment apparatus associated with the second mount, enabling a user to adjust the elasticity of the second mount to tune vibration effects of the system.

In some cases the cylinders of rubber-like material are mounted on a shaft having an axis, and the second mount includes a compression apparatus allowing compression of the elastomeric elements in the direction of the axis, thereby adjusting the elasticity of the second mount to tune vibration effects of the system. Also in some cases there may be a swing arm for mounting a rear wheel for a motorcycle using the frame and engine/transmission unit, wherein the swing arm mounts pivotally to the second mount integrally with the engine/transmission unit, thereby allowing the swing arm unit to rotate around the first mount in substantially a vertical plane of the frame, but allowing no pivotal movement in any other plane or any translation movement in any direction relative to the frame.

In another aspect of the invention a frame and engine assembly for motorcycle is provided, comprising a frame having a first frame interface for a first mount positioned at the rear and a second frame interface for a second mount positioned at the front; an engine/transmission unit having a first engine/transmission unit interface for the first mount and a second engine/transmission unit for the second mount; and a first mount and a second mount between the frame and the engine/transmission interface.

The assembly is characterized in that the first mount comprises all rigid bearing components mounted to solid elements interfacing to both the frame and the engine/transmission unit, the first mount thereby allowing the engine/transmission unit to rotate around the first mount in substantially a vertical plane of the frame, but allowing no pivotal movement in any other plane or any translation movement in any direction relative to the frame, and in that the second mount incorporates one or more elastomeric elements between solid elements interfacing to the frame and to the engine/transmission unit, thereby allowing substantially vertical translation of the engine transmission unit relative to the frame at the second mount, the translation of an amplitude limited by the elastomeric elements, and thereby limiting the rotation of the engine/transmission unit around the first pivotal mount.

In some embodiments the bearing components of the first mount comprise one or more journal bearings, while in others the bearing components of the first mount comprise one or more ball bearings.

In some cases the elastomeric elements of the second mount comprise one or more cylinders of rubber-like material, and in some of these embodiments there is adjustment apparatus associated with the second mount, enabling a user to adjust the elasticity of the second mount to tune vibration effects of the system.

In some embodiments of the invention the cylinders of rubber-like material are mounted on a shaft having an axis, and the second mount includes a compression apparatus allowing compression of the elastomeric elements in the direction of the axis, thereby adjusting the elasticity of the second mount to tune vibration effects of the system.

In some embodiments the assembly includes a swing arm for mounting a rear wheel for a motorcycle using the frame and engine/transmission assembly, wherein the swing arm mounts pivotally to the second mount integrally with the engine/transmission unit, thereby allowing the swing arm unit to rotate around the first mount in substantially a vertical plane of the frame, but allowing no pivotal movement in any other plane or any translation movement in any direction relative to the frame.

In yet another aspect of the invention a motorcycle is provided comprising a frame having a first frame interface for a first mount positioned at the rear and a second frame interface for a second mount positioned at the front; an engine/transmission unit having a first engine/transmission unit interface for the first mount and a second engine/transmission unit for the second mount; and a first mount and a second mount between the frame and the engine/transmission interface. This motorcycle is characterized in that the first mount comprises all rigid bearing components mounted to solid elements interfacing to both the frame and the engine/transmission unit, the first mount thereby allowing the engine/transmission unit to rotate around the first mount in substantially a vertical plane of the frame, but allowing no pivotal movement in any other plane or any translation movement in any direction relative to the frame, and in that the second mount incorporates one or more elastomeric elements between solid elements interfacing to the frame and to the engine/transmission unit, thereby allowing substantially vertical translation of the engine transmission unit relative to the frame at the second mount, the translation of an amplitude limited by the elastomeric elements, and thereby limiting the rotation of the engine/transmission unit around the first pivotal mount.

In some embodiments of the motorcycle the bearing components of the first mount comprise one or more journal bearings, and in some embodiments the bearing components of the first mount comprise one or more ball bearings.

In some cases the elastomeric elements of the second mount comprise one or more cylinders of rubber-like material. Also in some cases there is further provided adjustment apparatus associated with the second mount, enabling a user to adjust the elasticity of the second mount to tune vibration effects of the system.

In some cases the cylinders of rubber-like material are mounted on a shaft having an axis, and the second mount includes a compression apparatus allowing compression of the elastomeric elements in the direction of the axis, thereby adjusting the elasticity of the second mount to tune vibration effects of the system.

Also in some cases the assembly includes a swing arm for mounting a rear wheel for a motorcycle using the frame and engine/transmission assembly, wherein the swing arm mounts pivotally to the second mount integrally with the engine/transmission unit, thereby allowing the swing arm unit to rotate around the first mount in substantially a vertical plane of the frame, but allowing no pivotal movement in any other plane or any translation movement in any direction relative to the frame.

In various embodiments of the invention taught in enabling detail below, for the first time a system is provided that allows efficient mounting of an engine assembly in a motorcycle while eliminating many uncomfortable and dangerous effects that exist with conventional motorcycles as a result of having a rear mount with elastomeric elements that allow the rear wheel of the motorcycle to miss-align with the frame and the direction of travel of the motorcycle.

BRIEF DESCRIPTION OF THE DRAWING FIGURES

FIG. 5a is an elevation view of a housing of an elastomeric adjustable front engine mounting system according to an embodiment of the present invention.

FIG. 5b is an end view of the housing of FIG. 5a.

DESCRIPTION OF THE PREFERRED EMBODIMENTS

As described earlier in the background section, many different methods have been developed and are well-known in the art for the improvement of overall chassis, drive train and suspension rigidity including but not limited to using rigid engine mounts at all mounting locations, triangulation and other strengthening techniques in frame construction, strengthening of connections between engine and transmission, and so on. Much attention has also been devoted to the development of systems for isolating engine vibration from the frame, particularly for the styles of motorcycles described earlier with large twin-cylinder engines with excessive vibration. The present invention provides a method and apparatus allowing significant improvements to these aspects by combining a system of engine vibration dampening that increases in efficiency with engine frequency, with a method allowing significant rigidity between frame, power train and rear suspension.

Figure 1:
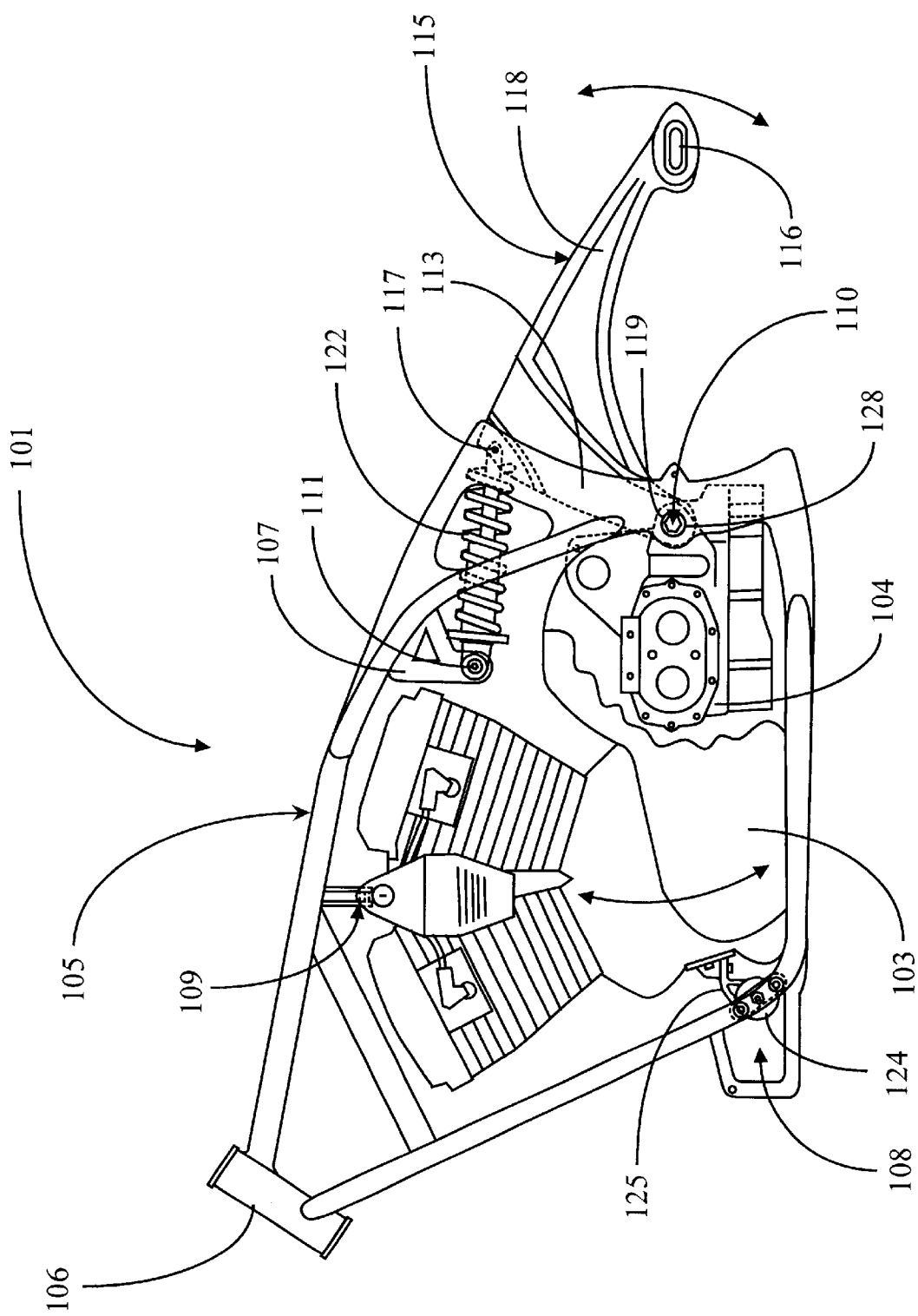
FIG. 1 is a side elevation view of a motorcycle frame, engine, transmission section, and rear suspension as used with an engine mounting system according to a preferred embodiment of the present invention.

FIG. 1 is a side elevation view of a motorcycle frame, engine, transmission, and rear suspension section 101 as used with an engine mounting system according to an embodiment of the present invention. Motorcycle section 101 is a greatly simplified view of a portion of a motorcycle only showing those main functional elements pertinent to the explanation of the present invention, which will be described below in enabling detail. Engine 103 is a large displacement, twin-cylinder engine standard in the popular style of motorcycle described earlier. A partial cutaway view is shown in engine 103 to show the positioning of a transmission portion 104, which, for reasons of clarity, also is only partially shown. In this embodiment transmission portion 104 is rigidly attached to engine 103 using attachment methods known in the art, with an intention of creating a single, rigid power train unit that can be securely mounted within frame 105.

As is typical with motorcycle chassis of the type shown here, three different engine-mounting locations are used, forming a triangular arrangement. A front engine mount 108 is located at the lower front end of the engine assembly and utilizes a user-adjustable method and apparatus for mounting to the frame using a pair of mounting brackets 124 and an internal elastomeric interface between the frame and the engine, and having a permanent external connection to an engine bracket 125, which is rigidly and removably attached to a solid member of the engine housing. Front engine mount 108 in this embodiment is a secure but resilient and easily adjustable engine mounting interface, utilizing an adjustment mechanism for changing the resiliency of the elastomeric interface that will be later described in enabling detail.

A top engine mount 109 consists of a bracket attached and extending down from the underside of the top horizontal member of frame 105 and in this embodiment utilizes an adjustable attachment mechanism, standard in many designs, permitting slight lateral adjustment in either direction to the top of the engine, and locking the position while maintaining a semi-rigid connection between a solid section of the upper engine and the frame. Such an engine mount provides an ability to compensate for lateral stresses and vibration imposed upon the engine during operation.

Frame 105, having many elements commonly found in typical frames of this type, is of tubular construction with a generally horizontal top frame member with a steering tube 106 located on one end for housing a steering fork assembly with an attached front wheel, and extending towards the rear downward into a pair of vertical frame members 113 each having significant strength designed into their structure to provide additional rigidity to the rear of the frame in the area where a rear swing arm 115 is mounted. Frame members 113 each have a frame pivot bore 119 designed for supporting the ends of a pivot axle, a component of a rear engine mounting system.

Swing arm 115 comprises a pair of dependent arms 118 with much rigidity designed into their structure, and is used for mounting the rear wheel assembly between arms 118 utilizing wheel mounts 116 for securing the ends of the rear wheel axle. Swing arm 115 is attached to the chassis of the motorcycle by a cantilevered connection utilizing a pivot axle, the ends of which are received by a pair of swing arm pivot holes 128. The intended direction of travel for the swing arm when connected in this position is up and down in a vertical plane relative to the frame. Shock absorber 122 in this example provides suspension resistance and connects swing arm 115 to a rigid frame member 107 using hole 111 of frame member 107, hole 117 of swing arm 115 and standard fasteners. As mentioned earlier, in order to maximize the stability and handling performance of a motorcycle with components such a shown, it is extremely important that the rear wheel experiences as little deflection as possible from its proper plane of rotation from the front wheel. Deflection of the rear wheel in the Z-axis of the plane of the front wheel can adversely affect handling and stability to a great extent, particularly dangerous during high-speed turns.

Rear engine mount 110 is provided in this embodiment as a significant improvement to apparatus and methods known in conventional art for improving rigidity in both the rear suspension pivot point and engine and power train, while significantly contributing to engine vibration isolation. This is achieved, as will also be described below in enabling detail, by providing a greatly strengthened rear motor mount that is also the pivot for the rear swing arm, and is made rigid except for the rotational freedom for the rotation of the swig arm in the plane of the rear wheel. The design of rear engine mount 110 is such that when securely fastened to the rigidly connected power train unit comprising engine 103 and transmission section 104, swing arm 115 is able to freely move up and down in the direction indicated in FIG. 1, with essentially zero lateral or rotary movement in any other plane, thereby eliminating unwanted rear wheel deflection. The rigid power train unit comprising engine 103 and transmission section 104 is also cantilevered at the rear engine mount 110 and because of the rigid rotatable design of rear engine mount 110, the unit comprising engine 103 and transmission section 104 is allowed very slight rotational movement in only a vertical plane, as indicated by the direction arrows in FIG. 1. In this arrangement, a large portion of rotary and reciprocal engine vibration is subdued at the rear by the solid properties of rear engine mount 110 and the connection to the rigid power train unit. Much of the remaining vibration is directed to the front softer elastomeric engine mount, unlike in conventional systems described earlier were the rear engine mount is much less solid (more resilient) and engine vibration is prominent at both the front and rear of the engine. The engine vibration still needing isolation is also restricted in this system to a vertical plane which can then be manipulated in a more controlled and satisfying manner by performing manual adjustments to the resilient front engine mount, or to the top engine mount, to achieve the best possible vibration dampening for varying engine operating frequencies and conditions.

A key advantage in directing such engine vibration from the rear forward and restricting the movement to a vertical plane, and by providing manually controlled adjustability to said vibration, is that such vibration in this system tends to be less pronounced at higher engine frequency, and as the engine frequency increases a tendency to seemingly smooth itself out (less vibration) is experienced. Although the engine vibration can still be quite pronounced at idle speed, the adjustability provided in such a system enables a user to perform adjustments to vibration according to personal riding style and preferences. For example, some riders may prefer to use an adjustment minimizing vibration at high engine operating frequencies because more of their riding time may be spent at higher speeds, whereas other riders may prefer to use an adjustment setting that compromises some level of high frequency vibration in favor of increased isolation for vibration in lower frequencies or idle speed.

Figure 2:
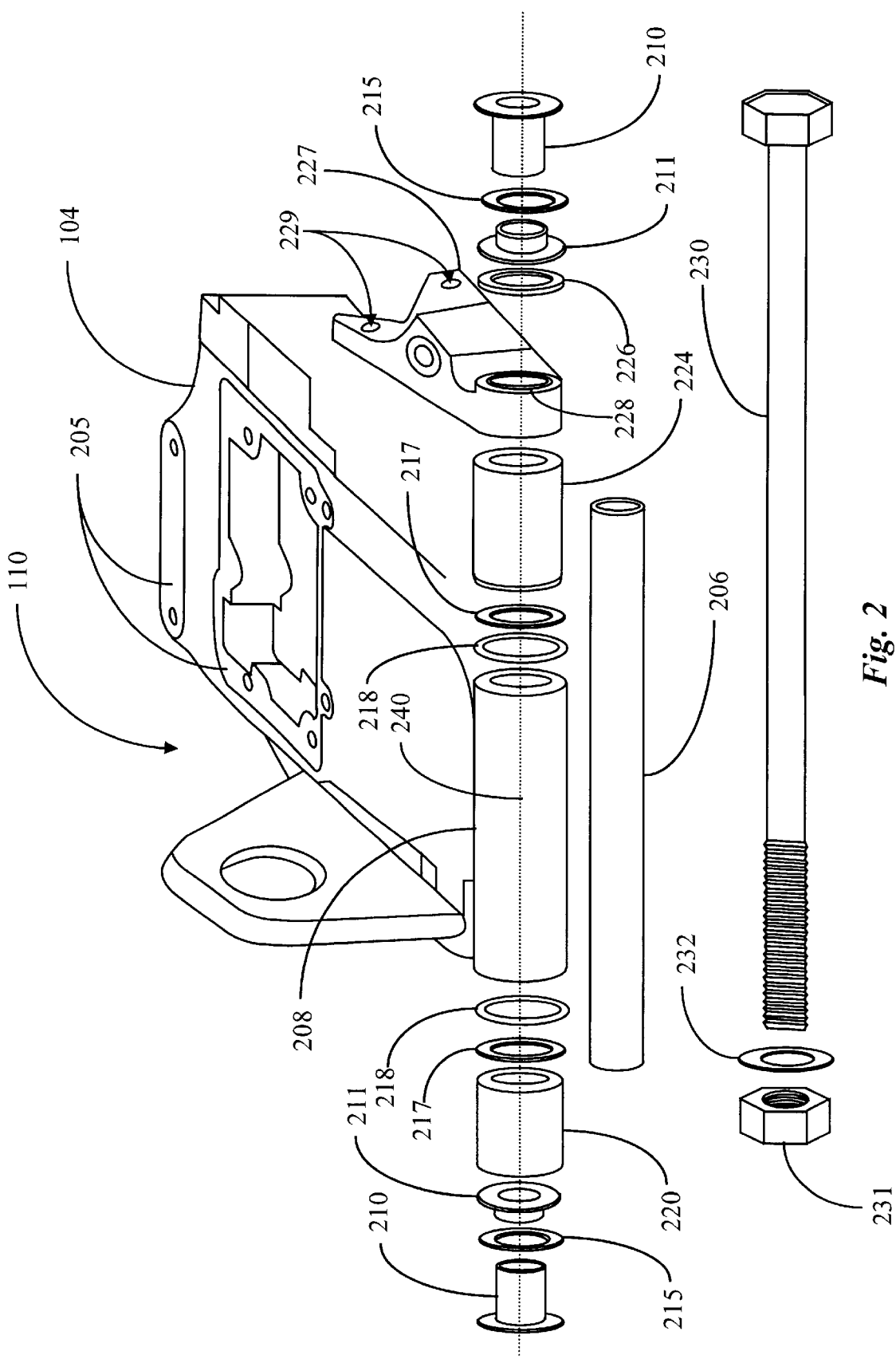
FIG. 2 is a perspective view of components of a rear engine mount according to a preferred embodiment of the present invention.

FIG. 2 is a perspective view of arranged components of rear engine mount 110 used with the engine mounting system of FIG. 1 according to a preferred embodiment of the present invention. Rear engine mount 110 is an improved engine mount provided by a solidly mounted journal bearing system formed by the assemblage of the various components shown here in detail and clarity, designed in this embodiment to be solidly integrated into transmission section 104 as a solid rear engine mount allowing only slight rotation of transmission section 104 around the axis represented by axis line 240, while eliminating any side-to-side movement. As is standard with most journal bearings of this type, the main components comprising swing arm pivot assembly 201 are manufactured of brass or similarly metal, and are impregnated in their manufacture with permanent lubricant elements so as to eliminate the need for periodic lubrication maintenance. The rigid unit formed by transmission section 104, solidly connected to engine 103 of FIG. 1, is cantilevered at the solid pivot point provided by swing arm pivot assembly 201. The arrangement allows slight vertical translation, in a vertical plane, of the front portion of the connected engine farthest from the pivot point, as shown in FIG. 1. Swing arm pivot assembly 201 is also designed in this embodiment to provide the pivot point for the rear swing arm 115 of FIG. 1 which is also cantilevered at the swing arm pivot assembly 201, and to also provide a means for attachment of swing arm 115 with minimal unwanted deflection and maximum free movement in a vertical plane.

In this view transmission section 104 of FIG. 1 is enlarged for clarity and shows the side opposite to that visible in FIG. 1 from a different perspective. Surfaces 205 shown at the top of transmission section 104 are for providing the flat mating surfaces for attachment of other components of the motorcycle transmission that are rigidly attached to transmission section 104, but are not shown here for reasons of clarity. On the end of transmission section 104 opposite surfaces 205 is a cylindrically shaped pivot housing 208, tubular in form and having a hollow core forming a passage 209 that extends entirely through the length of pivot housing 208. Pivot housing 208 in this embodiment is a reinforced integral portion of transmission section 104, cast or otherwise formed into the structure of transmission section 104 with its length running perpendicular to that of transmission section 104, which is made of hard steel or similarly very strong and rigid metal.

A reinforcing sleeve 206, tubular in shape, is provided to allow for reinforced alignment of the additional components and for supplementing the solidity of the inner walls of passage 209. Reinforcing sleeve 206 is designed to be inserted through passage 209 of pivot housing 208 and firmly held within pivot housing 208 in a relative centered position. This is possible because reinforcing sleeve 206 is designed with an outer diameter that is only minimally less the inner diameter of passage 209, a difference in diameter slight enough to cause a snug fit allowing no side-to-side movement of reinforcing sleeve 206 when held within passage 209. A cap washer 210, cap washer 211 and washer 215 are used in this example for providing a solid, reinforced and protected passage through pivot hole 119 of vertical frame member 113.

An identical set of washers is used on either side of transmission section 104 to provide such protection and reinforcement for each of the two pivot holes 119, and is used for mounting swing arm 115 to frame 105. The exact use and placement will be clearly shown later in detail. A standard spacer 220, cylindrical in shape is provided for the purpose of allowing proper spacing and alignment between swing arm 115, frame 105 and transmission section 104 once all of the components comprising pivot assembly 201 are properly assembled. The hole extending through spacer 220 has a diameter, only slightly greater than the outside diameter of reinforcing sleeve 206.

Spacer 220 is designed to tightly fit over the end reinforcing sleeve 206, allowing rotation while eliminating any side-to-side movement. A standard thrust washer 217, having an outside diameter equal to that of spacer 220 is positioned between spacer 220 and a standard rubber O-ring 218. O-ring 218 has an outside diameter slightly larger than that of spacer 220, and is used for preventing dirt and moisture from entering pivot housing 208. A rubber O-ring 218 and thrust washer 217 are also used on the opposite end of transmission section 104, positioned between pivot housing 208 and a spacer 224. Spacer 224 is similar in size in shape to spacer 220 having an identical outside and inside diameter, but is slightly longer in length with the edge facing thrust washer 217 slightly beveled to ease rotation when assembled with the remaining components.

A pivot plate 227 is cast from the same metal material used in the manufacture of transmission section 104, and has the purpose of supplementing the rigidity and integrity of the rotatable assemblage made for transmission section 104 by the remaining components of pivot assembly 201. One end of pivot plate 227 has a hole passing completely through and has a brass bushing 228 inserted having an inside diameter equal to that of spacer 224 and is also designed so that reinforcing sleeve 206 can be inserted and rotated with no side-to-side movement. Pivot plate 227 has a pair of holes 229 on the end opposite of brass bushing 228, and is designed to be rigidly connected to transmission section 104 using standard fasteners through holes 229. A standard hardened pivot bolt 230, used with nut 231 and washer 232 are used to secure the components of pivot assembly 201 with swing arm 115 and frame 105, as will be shown below in detail.

The skilled artisan will recognize that the assembly described above with aid of FIG. 2 is but one equivalent way of providing a rigid rotational mounting for the rear mount of the engine assembly and the swing arm. The assembly might use ball bearings or other sorts of bearings instead of solid, pre-lubricated journals, for example, and there are several equivalent ways the assembly might be made.

As previously described transmission section 104 is attached to engine 103 of FIG. 1 using rigid connections that greatly strengthen the engine and transmission assembly as a rigid power train unit. The components of pivot assembly 201 in this example form a permanently lubricated solid journal bearing that, when assembled according to a preferred embodiment of the present invention provides the means for a solid rotatable connection between the cantilevered power train unit comprised of transmission section 104 and engine 103, rear swing arm 115 and frame 105. Using such an arrangement, it is an object of the present invention to provide such a connection that eliminates any side deflection in the swing arm or power train unit while providing a means for engine vibration reduction.

Figure 3:
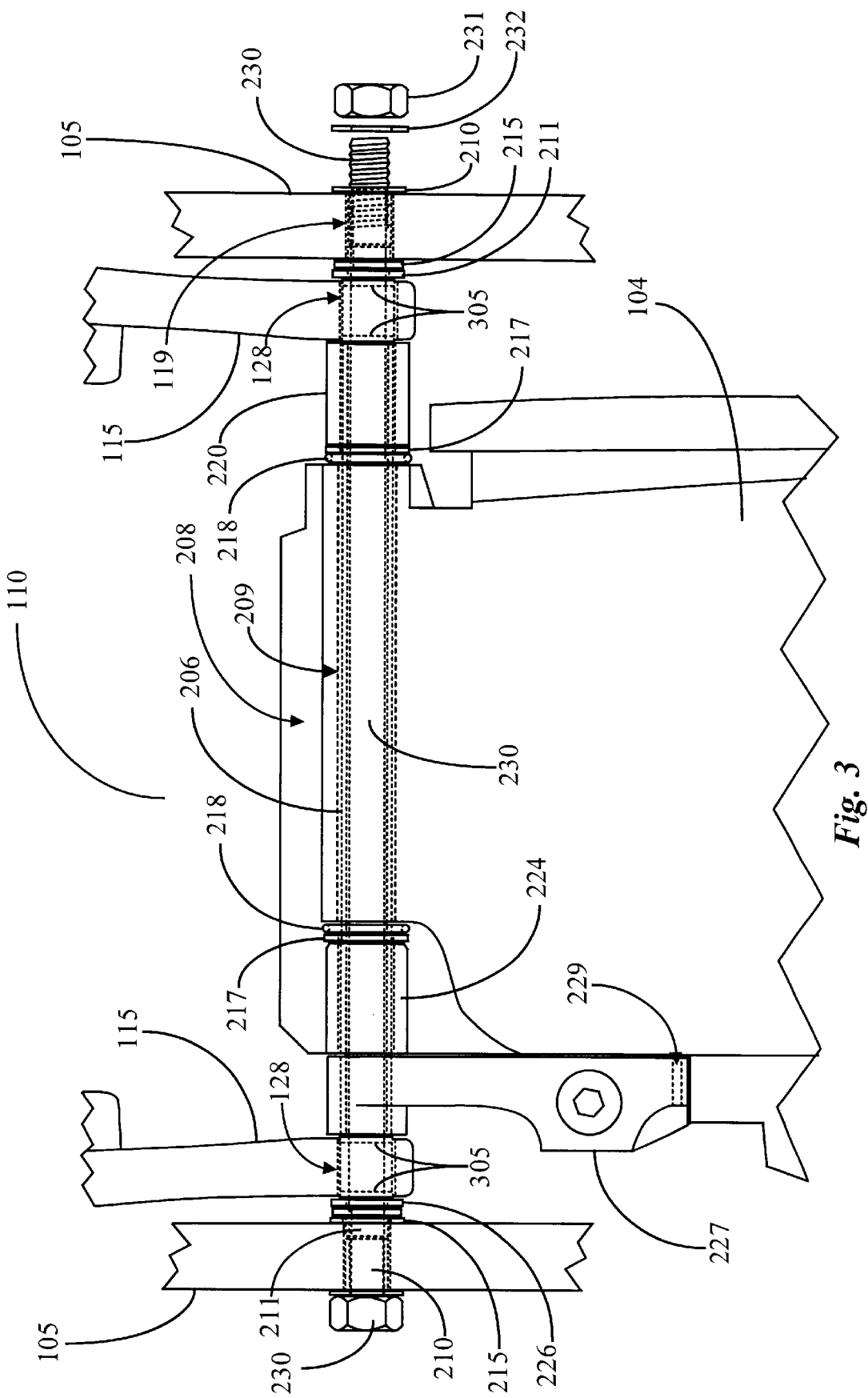
FIG. 3 is a broken top view of a portion of a transmission section and swing arm pivot components of FIG. 2, assembled with the rear swing arm and frame of FIG. 1, according to a preferred embodiment of the present invention.

FIG. 3 is a broken top view of a portion of transmission section 104 and the components of rear engine mount 110 of FIG. 2, assembled with the rear swing arm and frame of FIG. 1, according to a preferred embodiment of the present invention. In this view a clear representation is made of the proper positioning and assembly of the components previously described comprising the swing arm pivot assembly. In this view pivot housing 208 of transmission section 104 has reinforcing sleeve 206 inserted and positioned within passage 209. O-rings 218 and washers 217 are positioned as shown, over the extended ends of reinforcing sleeve 206, on each side of pivot housing 208 with spacer 224, its beveled edge against washer 217, and spacer 220 also positioned over reinforcing sleeve 206 on either side of pivot housing 208. Pivot plate 227 is shown in its proper position with its pivot hole positioned over the end of reinforcing sleeve 206 and aligned with spacer 224, with the opposite end rigidly attached to transmission section 104 using standard fasteners through holes 229.

Reinforcing sleeve 206 can now be seen passing through all of the components described thus far, extending from flush with the outer edge of pivot plate 227, through the first washer 217 and O-ring 218, through pivot housing 208 and extending out from the opposite side of pivot housing 208 through the second washer 217 and O-ring 218 and finally through spacer 220, with the end of reinforcing sleeve 206 flush with the outer edge of spacer 220. Swing arm 115 is positioned over the outside edge of pivot plate 227 and spacer 220. A thick washer 226 is then positioned as shown on one outer edge of swing arm 115 acting as a spacer to aid in the free rotation of the swing arm 115. Both pivot holes 119 of frame 105 can be seen with cap washers 210 and 211 and washer 215 properly positioned. Pivot bolt 230 is then inserted, as can be seen in this view, through the first pivot hole 119 of frame 105, and is extended through all of the components shown until extending out through the opposite pivot hole 119 of frame 105. The entire assembly is then secured to frame 105 using washer 232 and nut 231. Free rotation is provided to swing arm 115 in this embodiment by a set of roller bearings 305 installed at the pivoting end.

The skilled artisan will recognize that there are equivalent ways to mount the swing arm assembly other than exactly that shown.

Figure 4:
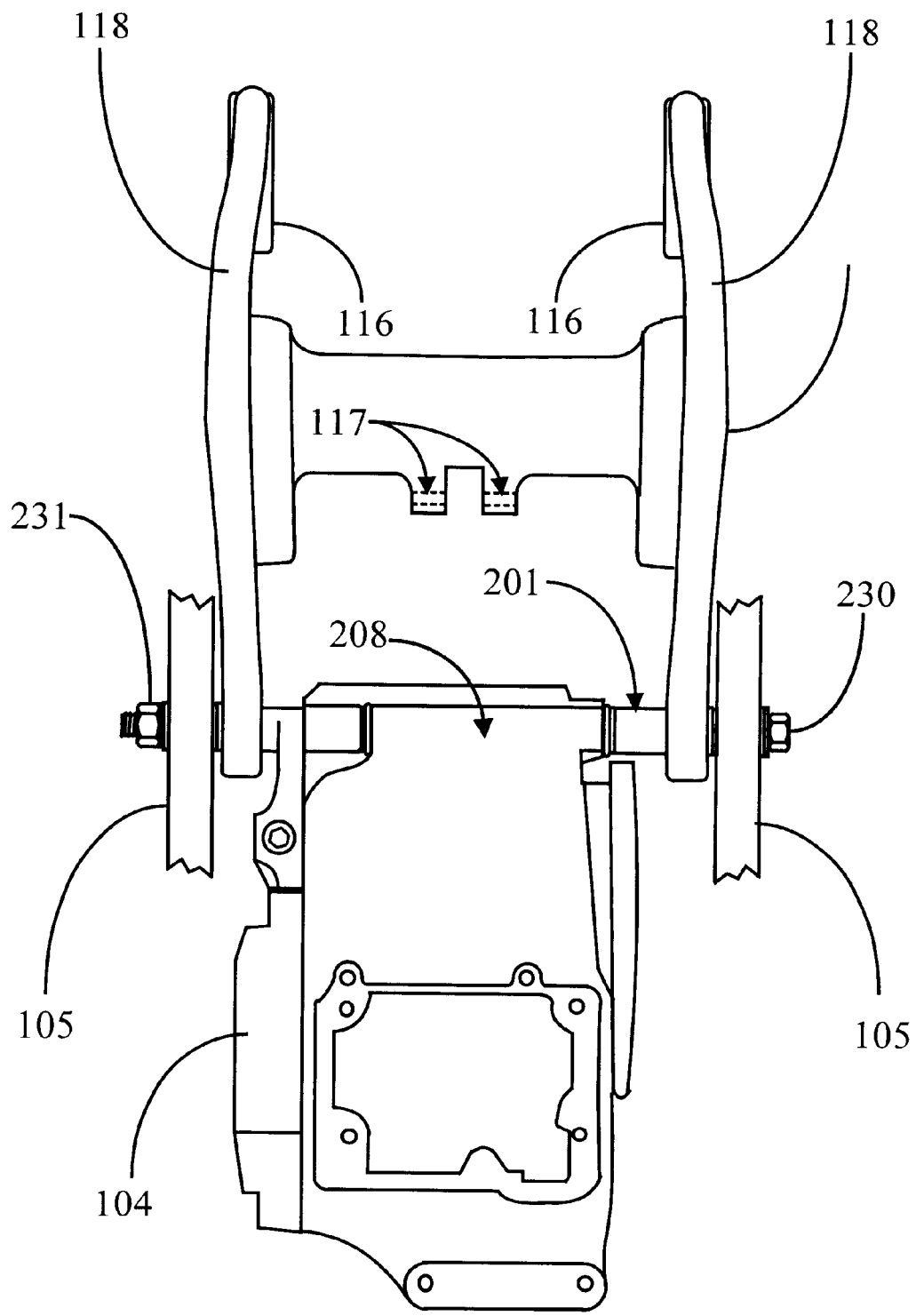
FIG. 4 is a top view of the rear swing arm, transmission section, rear engine mount components and sections of the frame of FIG. 3, assembled and secured according to an embodiment of the present invention.

FIG. 4 is a top view of rear swing arm 115, transmission section 104, components of rear engine mount 110 and sections of frame 105 of FIG. 3, assembled according to an embodiment of the present invention. In this view the entire swing arm 115 can be seen properly attached to transmission section 104 and sections of frame 105 with the components of rear engine mount 110. Shock absorber mounting holes 117 can be seen at the center of swing arm 115, with wheel mounts 116 located at the end of arms 118. Pivot bolt 230 is seen here completely passed through frame sections 105, swing arm 115, pivot housing 208 of transmission section 104 and all of the remaining components of pivot assembly 201, secured with nut 231. Nut 231 is tightened to specification firmly securing swing arm 115, transmission section 104 and remaining pivot assembly components to frame 105.

Once all of the rear engine mount components are properly assembled with swing arm 115 and transmission section 104, attached to frame 105 and properly fastened together as in FIG. 4, a solid, rotatable rear engine mount is provided, allowing cantilevered swing arm 115 to freely swing up and down with no side-to-side deflection or twist. Also provided by this arrangement, as previously mentioned, is a method for solidly cantilevering transmission section 104 which is rigidly attached to engine 103 of FIG. 1 forming a rigid power train unit, as previously described. Slight rotation of the power train unit formed by transmission section 104 and engine 103 is allowed in this arrangement, while any side-to-side movement of the assembly is eliminated. By utilizing the described system for attaching the swing arm and mounting the rear of the engine to the frame, much of the engine vibration is now directed towards the front of the engine and will be more pronounced in this area. FIG. 5*a* is an elevation view of a housing for an elastomeric adjustable front engine mounting system. Housing 501 is used for encasing internal components of the system and has a barrel-shaped outer casing 502 with a hollow center forming an inner wall 504. The ends of outer casing 501 are protected and reinforced with ring-shaped end caps 508, designed to securely fit on the ends of outer casing 501 and may or may not be removable from housing 501.

FIG. 5*b* is an end view of housing 501 of FIG. 5*a* illustrating the circular shape and hollow center.

Figure 6:
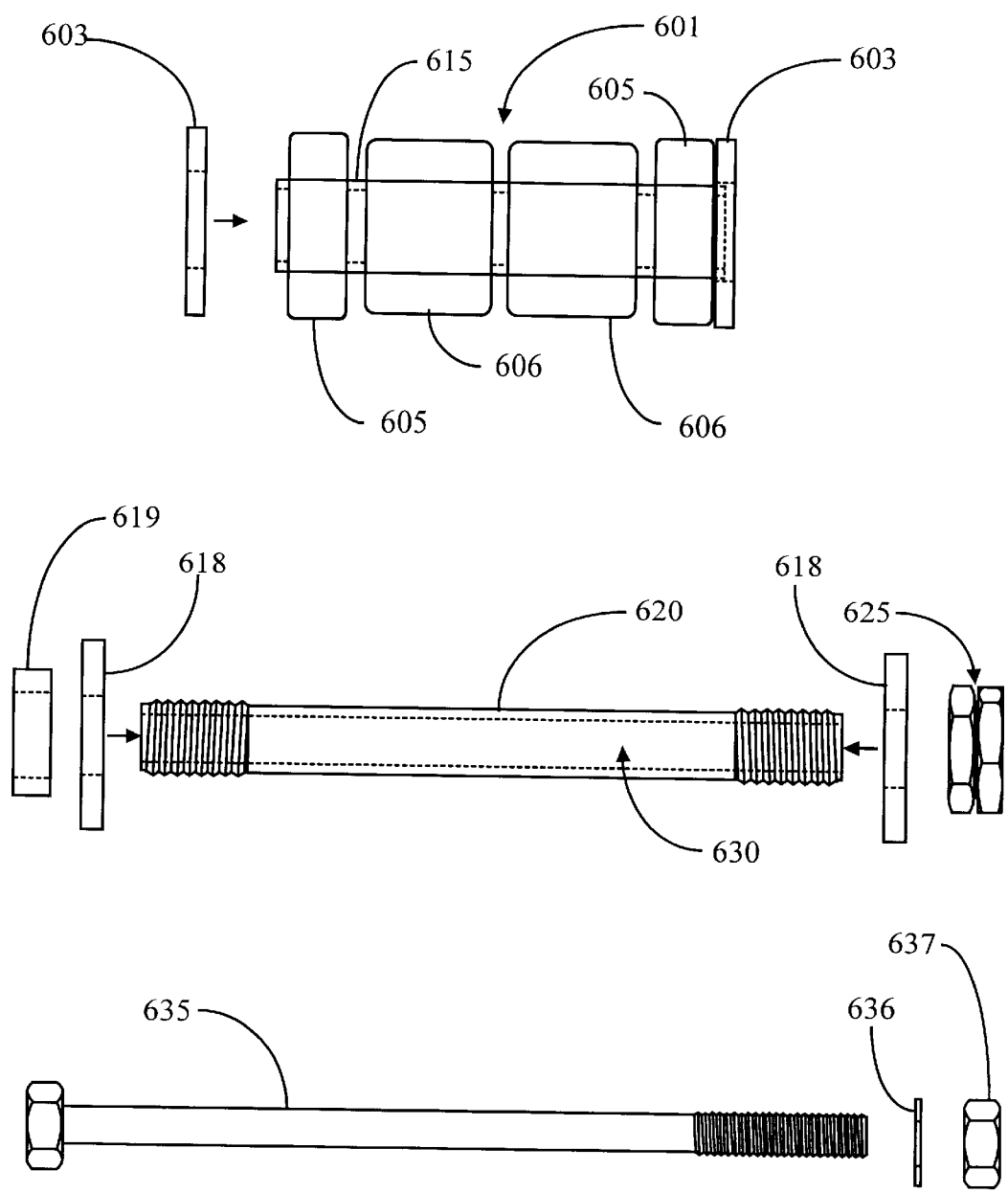
FIG. 6 is an elevation view of internal and fastening components of an elastomeric adjustable front engine mounting system according to an embodiment of the invention.

FIG. 6 is an elevation view of internal and fastening components of an elastomeric adjustable front engine mounting system. Expander 601 is the resilient interface used in the elastomeric front engine mounting system that will be described. Expander 601 is manufactured of rubber, synthetic rubber, or a resilient elastomer, and comprises a set of two outer doughnuts 605 and a set of two inner doughnuts 606 positioned between outer doughnuts 605. Outer doughnuts 605 and inner doughnuts 606 are circular in shape and permanently attached to a center section 615. Section 615 is tubular with a hollow center allowing the passage of threaded mounting shaft 620. Outer doughnuts 605, inner doughnuts 606 and center section 615 are all permanently attached as a one-piece elastomeric expander apparatus. The hollow passage formed by center section 615 of expander 601 is of a diameter slightly greater than the outside diameter of mounting shaft 620, allowing passage of mounting shaft 620 through center section 615. A pair of spacers 603, resembling large, round washers, and each having a hole with the diameter slightly greater than the outside diameter of section 615, are designed to slip over the ends of section 615 in the direction indicated. The outer diameter of spacers 603 is slightly less than that of the inner diameter of housing 501 of FIG. 5a, and slightly larger than the outside diameter of outer doughnuts 605 and inner doughnuts 606.

Mounting shaft 620, threaded at both ends, has a hollow center forming a passage 630. Spacers 618 are similar in size in shape to spacers 603, having an equal outside diameter and thickness, but with holes having a smaller diameter than those of spacers 603, but slightly greater than the outside diameter of mounting shaft 620, and slightly less than the outside diameter of center section 615 of expander 601. Spacers 618 are designed to slip over the ends of mounting shaft 620 in the directions indicated. Spacer 619 is also designed to slip over the end of mounting shaft 620, having a hole with a diameter equal to that of spacers 618, and an outside diameter smaller than that of spacers 618. A set of standard jam nuts 625 are threaded and designed to be screwed onto the threaded end of mounting shaft 620. A standard threaded bolt 635, having a length slightly greater than that of mounting shaft 620, and a diameter slightly less than that of passage 630, are used with washer 636 and nut 637 for the purpose of securing of the assembled components of the front engine mounting system to the frame, as will be shown in detail.

Figure 7:
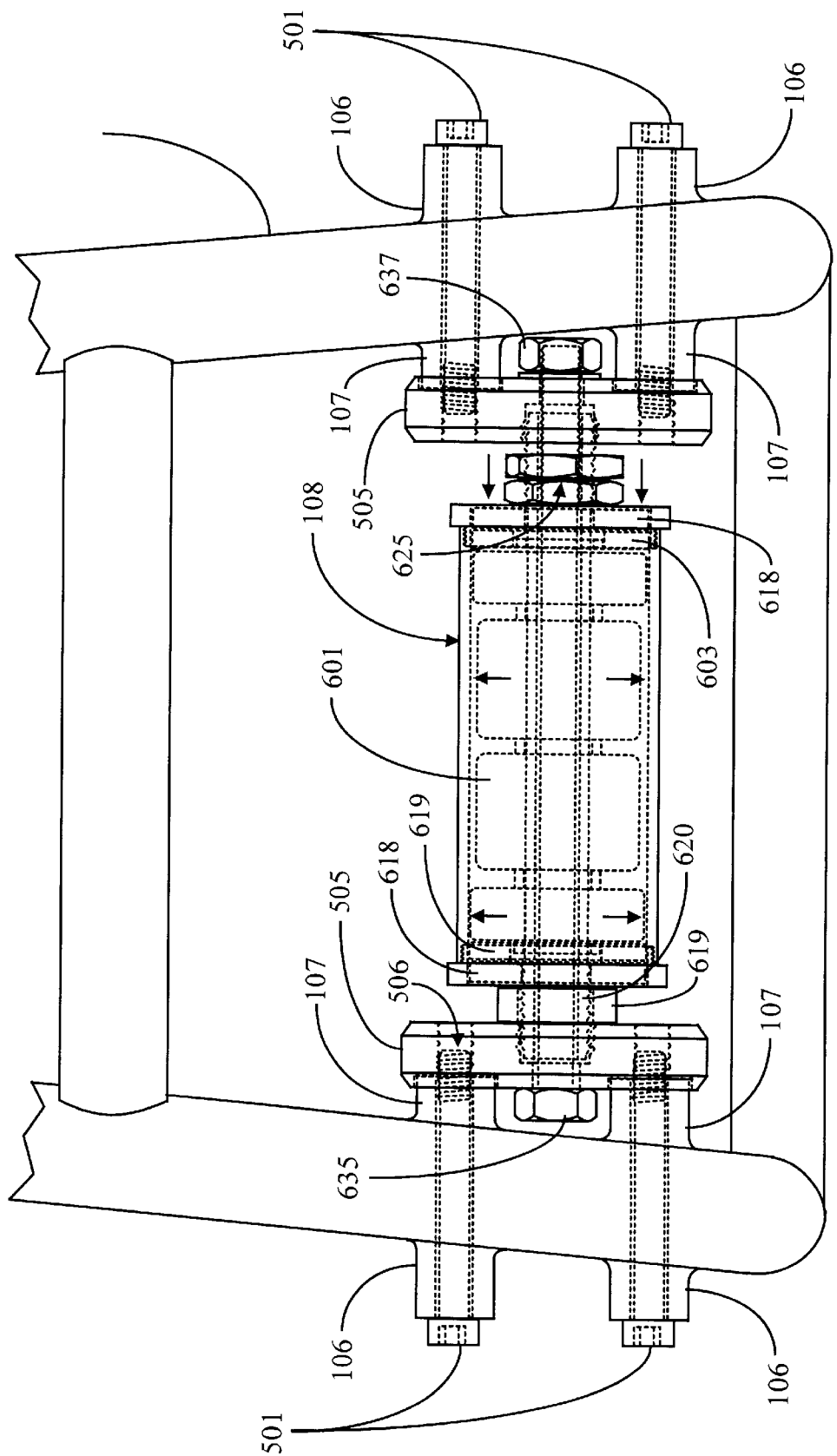
FIG. 7 is an elevation view of the front of the frame of FIG. 1 and the attached elastomeric adjustable front engine mounting system of FIG. 5.

FIG. 7 is an elevation view of the front of frame 105 of FIG. 1 and an assembled elastomeric adjustable front engine mounting system comprising the components of FIG. 5a and FIG. 6. Front engine mount 108 is an elastomeric engine mounting system that allows user adjustability of the level of resilience provided by the mounting interface. Mounting shaft 620 is the center element of front engine mount 108 and is the mounting interface between the frame and the elastomeric interface provided by the rubber expander 601. As shown in this view, expander 601 is fitted over mounting shaft 620 and held in place within housing 501 with set of spacers, comprising a spacer 525 and 526, on each end. Spacer 619 is also slipped over one end of mounting shaft 620 providing a necessary spacing between spacer 618 and mounting bracket 505, as well as providing the stop point for adjustments to the system. Jam nuts 625 are threaded onto one end of mounting shaft 620 and screwed down until coming into contact with spacer 618.

Mounting bracket 505, each having a threaded center portion extending approximately halfway through its thickness, is then screwed onto each end of mounting shaft 620. This mounting bracket is analogous to brackets 124 illustrated in FIG. 1. Bolt 635 is then passed through the entire assembly as shown and secured with nut 637. Frame 105 has a set of outer mounting protrusions 106 and inner mounting protrusions 107, all circular in shape and welded or otherwise permanently attached to frame 105 for the purpose of securely attaching front engine mount 108 to frame 105 using a set of 4 standard bolts 501. A hole extends through each outer protrusion 106, passing completely through the frame, and completely through the inner protrusions 107. Brackets 505, provided as a mounting interface and attached on either side of front engine mount 108, have one side with a pair of circular voids designed to fit snugly over inner protrusions 107, and are fastened to inner protrusions 107 using bolts 501, which are passed through the frame via the inner and outer protrusions in screwed into the threaded holes 506 of brackets 505.

The resiliency of the system can now be changed by adjusting the position of jam nuts 625 which, when screwed in towards expander 601, presses spacer 618 against spacer 603, which is in contact with expander 601 which is stopped at the other end by spacer 619. Such inward pressure causes expander 601 to expand outward in a direction indicated, and to impress against the inner walls of housing 501. Continued clockwise rotation of jam nuts 625 on mounting shaft 620 increases expansion of expander 601, causing greater compression and less resiliency. Likewise, counter clockwise rotation of jam nuts 625 have the opposite effect, lessening pressure on spacers 618 and 603 and thereby lessening the compression and increasing the resiliency of expander 601. Once the desired resiliency is found, jam nuts 625 are tightened against each other preventing further rotation. Housing 601 in this example is rigidly connected to the engine using an engine bracket 125, as shown in FIG. 1. Engine bracket 125 is removably attached to engine 103 using standard fasteners, and is rigidly and permanently connected to housing 601 such as by welding.

It will apparent to the skilled artisan that the system described above with the aid of FIG. 7 is exemplary only, and that the same effects could be accomplished using considerably altered apparatus. The key is to provide a resilient bushing arrangement for the front engine mount, wherein the resiliency may be adjusted by the end user to provide a desired effect.

Utilizing the adjustability described for front engine mount 108, the user has the ability adjust the level of vibration dampening to suit a particular riding style or preference. A distinct advantage is provided by this capability compared to other conventional elastomeric front engine mounts, which commonly require the addition or subtraction of elastic elements, or the replacing of elastic elements with elements of different durometer. In alternative embodiments of the present invention however, other methods of adjusting the resiliency of a front engine mount can be utilized without departing from the spirit scope of the present invention.

The rear engine mount of the present invention, when used with a conventional elastomeric front engine mount such as described, provides significant improvements in engine vibration isolation while maintaining the strength and rigidity of the motorcycle chassis, drive train and rear suspension. It'll be apparent to one of ordinary skill in the art that the embodiments described can be used in different types of motorcycle frames and can be used with different elastomeric front engine mounts in alternative embodiments without departing from the spirit of the present invention. For these reasons the invention should be allowed the broadest possible scope based on claims that follow.

What is claimed is:

1. A vibration-isolation system for assembly of a motorcycle frame with an engine/transmission unit, comprising:
   a first pivotal mount at a rear portion of the frame and engine/transmission unit, the first mount comprising all rigid bearing components mounted to solid elements of both the frame and the engine/transmission unit, the first mount thereby allowing the engine/transmission unit to rotate around the first mount in substantially a vertical plane of the frame, but allowing no pivotal movement in any other plane or any translation movement in any direction relative to the frame; and
   a second mount at a front portion of the frame and engine/transmission unit, the second mount incorporating one or more elastomeric elements between a solid interface to the frame and a solid interface to the engine/transmission unit, thereby allowing substantially vertical translation of the engine transmission unit relative to the frame at the second mount, the translation of an amplitude limited by the elastomeric elements, and thereby limiting the rotation of the engine/transmission unit around the first pivotal mount.

2. The system of claim 1 wherein the bearing components.of the first mount comprise one or more journal bearings.

3. The system of claim 1 wherein the bearing components of the first mount comprise one or more ball bearings.

4. The system of claim 1 wherein the elastomeric elements of the second mount comprise one or more cylinders of rubber-like material.

5. The system of claim 1 further comprising adjustment apparatus associated with the second mount, enabling a user to adjust the elasticity of the second mount to tune vibration effects of the system.

6. The system of claim 4 wherein the cylinders of rubber-like material are mounted on a shaft having an axis, and the second mount includes a compression apparatus allowing compression of the elastomeric elements in the direction of the axis, thereby adjusting the elasticity of the second mount to tune vibration effects of the system.

7. The system of claim 1 wherein the assembly includes a swing arm for mounting a rear wheel for a motorcycle using the frame and engine/transmission unit, wherein the swing arm mounts pivotally to the second mount integrally with the engine/transmission unit, thereby allowing the swing arm unit to rotate around the first mount in substantially a vertical plane of the frame, but allowing no pivotal movement in any other plane or any translation movement in any direction relative to the frame.

8. A method for mounting an engine/transmission unit to a frame for a motorcycle to isolate vibration, comprising steps of:
   (a) mounting the engine/transmission unit to a first pivotal mount at a rear portion of the frame, the first mount comprising all rigid bearing components mounted to solid elements of both the frame and the engine/transmission unit, the first mount thereby allowing the engine/transmission unit to rotate around the first mount in substantially a vertical plane of the frame, but allowing no pivotal movement in any other plane or any translation movement in any direction relative to the frame; and
   (b) mounting the engine/transmission unit to a second mount at a front portion of the frame and engine/transmission unit, the second mount incorporating one or more elastomeric elements between a solid interface to the frame and a solid interface to the engine/transmission unit, thereby allowing substantially vertical translation of the engine transmission unit relative to the frame at the second mount, the translation of an amplitude limited by the elastomeric elements, and thereby limiting the rotation of the engine/transmission unit around the first pivotal mount.

9. The method of claim 8 wherein the bearing components of the first mount comprise one or more journal bearings.

10. The method of claim 8 wherein the bearing components of the first mount comprise one or more ball bearings.

11. The method of claim 8 wherein the elastomeric elements of the second mount comprise one or more cylinders of rubber-like material.

12. The method of claim 8 further comprising adjustment apparatus associated with the second mount, enabling a user to adjust the elasticity of the second mount to tune vibration effects of the system.

13. The method of claim 11 wherein the cylinders of rubber-like material are mounted on a shaft having an axis, and the second mount includes a compression apparatus allowing compression of the elastomeric elements in the direction of the axis, thereby adjusting the elasticity of the second mount to tune vibration effects of the system.

14. The method of claim 8 wherein the assembly includes a swing arm for mounting a rear wheel for a motorcycle using the frame and engine/transmission unit, wherein the swing arm mounts pivotally to the second mount integrally with the engine/transmission unit, thereby allowing the swing arm unit to rotate around the first mount in substantially a vertical plane of the frame, but allowing no pivotal movement in any other plane or any translation movement in any direction relative to the frame.

15. A frame and engine assembly for motorcycle, comprising:
   a frame having a first frame interface for a first mount positioned at the rear and a second frame interface for a second mount positioned at the front;
   an engine/transmission unit having a first engine/transmission unit interface for the first mount and a second engine/transmission unit for the second mount; and
   a first mount and a second mount between the frame and the engine/transmission interface;
   characterized in that the first mount comprises all rigid bearing components mounted to solid elements interfacing to both the frame and the engine/transmission unit, the first mount thereby allowing the engine/transmission unit to rotate around the first mount in substantially a vertical plane of the frame, but allowing no pivotal movement in any other plane or any translation movement in any direction relative to the frame, and in that the second mount incorporates one or more elastomeric elements between solid elements interfacing to the frame and to the engine/transmission unit, thereby allowing substantially vertical translation of the engine transmission unit relative to the frame at the second mount, the translation of an amplitude limited by the elastomeric elements, and thereby limiting the rotation of the engine/transmission unit around the first pivotal mount.

16. The frame and engine assembly of claim 15 wherein the bearing components of the first mount comprise one or more journal bearings.

17. The frame and engine assembly of claim 15 wherein the bearing components of the first mount comprise one or more ball bearings.

18. The frame and engine assembly of claim 15 wherein the elastomeric elements of the second mount comprise one or more cylinders of rubber-like material.

19. The frame and engine assembly of claim 15 further comprising adjustment apparatus associated with the second mount, enabling a user to adjust the elasticity of the second mount to tune vibration effects of the system.

20. The frame and engine assembly of claim 18 wherein the cylinders of rubber-like material are mounted on a shaft having an axis, and the second mount includes a compression apparatus allowing compression of the elastomeric elements in the direction of the axis, thereby adjusting the elasticity of the second mount to tune vibration effects of the system.

21. The frame and engine assembly of claim 15 wherein the assembly includes a swing arm for mounting a rear wheel for a motorcycle using the frame and engine/transmission assembly, wherein the swing arm mounts pivotally to the second mount integrally with the engine/transmission unit, thereby allowing the swing arm unit to rotate around the first mount in substantially a vertical plane of the frame, but allowing no pivotal movement in any other plane or any translation movement in any direction relative to the frame.

22. A motorcycle comprising:
    a frame having a first frame interface for a first mount positioned at the rear and a second frame interface for a second mount positioned at the front;
    an engine/transmission unit having a first engine/transmission unit interface for the first mount and a second engine/transmission unit for the second mount; and
    a first mount and a second mount between the frame and the engine/transmission interface;
        characterized in that the first mount comprises all rigid bearing components mounted to solid elements interfacing to both the frame and the engine/transmission unit, the first mount thereby allowing the engine/transmission unit to rotate around the first mount in substantially a vertical plane of the frame, but allowing no pivotal movement in any other plane or any translation movement in any direction relative to the frame, and in that the second mount incorporates one or more elastomeric elements between solid elements interfacing to the frame and to the engine/transmission unit, thereby allowing substantially vertical translation of the engine transmission unit relative to the frame at the second mount, the translation of an amplitude limited by the elastomeric elements, and thereby limiting the rotation of the engine/transmission unit around the first pivotal mount.

23. The motorcycle of claim 22 wherein the bearing components of the first mount comprise one or more journal bearings.

24. The motorcycle of claim 22 wherein the bearing components of the first mount comprise one or more ball bearings.

25. The motorcycle of claim 22 wherein the elastomeric elements of the second mount comprise one or more cylinders of rubber-like material.

26. The motorcycle of claim 22 further comprising adjustment apparatus associated with the second mount, enabling a user to adjust the elasticity of the second mount to tune vibration effects of the system.

27. The motorcycle of claim 25 wherein the cylinders of rubber-like material are mounted on a shaft having an axis, and the second mount includes a compression apparatus allowing compression of the elastomeric elements in the direction of the axis, thereby adjusting the elasticity of the second mount to tune vibration effects of the system.

28. The motorcycle of claim 22 wherein the assembly includes a swing arm for mounting a rear wheel for a motorcycle using the frame and engine/transmission assembly, wherein the swing arm mounts pivotally to the second mount integrally with the engine/transmission unit, thereby allowing the swing arm unit to rotate around the first mount in substantially a vertical plane of the frame, but allowing no pivotal movement in any other plane or any translation movement in any direction relative to the frame.

* * * * *